United States Patent
Spagnolo et al.

(10) Patent No.: US 12,044,212 B2
(45) Date of Patent: Jul. 23, 2024

(54) CONTROLLING A WIND TURBINE WITH AN UPDATED POWER COEFFICIENT ADJUSTED BY A DEGRADATION FUNCTION

(71) Applicant: VESTAS WIND SYSTEMS A/S, Aarhus N (DK)

(72) Inventors: Fabio Spagnolo, Aarhus C (DK); Sebastiaan Mulders, Rotterdam (NL); Jan-Willem Van Wingerden, Barendrecht (NL)

(73) Assignee: VESTAS WIND SYSTEMS A/S, Aarhus N (DK)

(*) Notice: Subject to any disclaimer, the term of this patent is extended or adjusted under 35 U.S.C. 154(b) by 0 days.

(21) Appl. No.: 18/537,370

(22) Filed: Dec. 12, 2023

(65) Prior Publication Data
US 2024/0209834 A1    Jun. 27, 2024

(30) Foreign Application Priority Data
Dec. 12, 2022    (EP) .................................... 22212800

(51) Int. Cl.
*F03D 7/02*    (2006.01)
*H02P 9/00*    (2006.01)
*H02P 101/15*    (2016.01)

(52) U.S. Cl.
CPC .............. *F03D 7/028* (2013.01); *H02P 9/008* (2013.01); *F05B 2270/1033* (2013.01);
(Continued)

(58) Field of Classification Search
CPC ...... F03D 7/028; H02P 9/008; H02P 2101/15; F05B 2270/1033; F05B 2270/32; F05B 2270/8042; F05B 2270/327
(Continued)

(56) References Cited

U.S. PATENT DOCUMENTS

2016/0265509 A1*    9/2016    Movsichoff ............ F03D 7/0276

FOREIGN PATENT DOCUMENTS

| EP | 2719895 A1 | 4/2014 |
| EP | 3088733 A1 | 11/2016 |

OTHER PUBLICATIONS

European Patent Office, extended European Search Report for Application 22212800.1-1002 dated Nov. 5, 2023.
(Continued)

*Primary Examiner* — Aditya S Bhat
(74) *Attorney, Agent, or Firm* — Patterson + Sheridan, LLP

(57) ABSTRACT

The present invention relates to controlling a wind turbine with an updated power coefficient. The updated power coefficient being adjusted by a degradation function which is determined in an iterative adjustment process. The wind turbine is controlled in partial load operation mode based on a tip-speed ratio (TSR) tracking scheme based on an estimated wind speed. The iterative adjustment process comprises operating the wind turbine to obtain a measurement set. The degradation function that represents the values of the measurement set is calculated and assigned to the mean operating TSR of the measurement set. The iterative process is continued until a difference between the selected TSR and the mean operating TSR is below a preset difference. A continuous degradation function for a range of the mean operating TSR value(s) is thereby obtained to determine an updated power coefficient to be used as the operating power coefficient.

15 Claims, 4 Drawing Sheets

(52) U.S. Cl.
CPC ..... *F05B 2270/32* (2013.01); *F05B 2270/327* (2013.01); *F05B 2270/8042* (2013.01); *H02P 2101/15* (2015.01)

(58) Field of Classification Search
USPC .......................................................... 702/64
See application file for complete search history.

(56) References Cited

OTHER PUBLICATIONS

Mohsen Nourbakhsh Soltani et al., "Estimation of Rotor Effective Wind Speed: A Comparison," IEEE Transactions on Control Systems Technology, vol. 21, No. 4, Dated: Jul. 1, 2013, pp. 1155-1167.

* cited by examiner

CONTROLLING A WIND TURBINE WITH AN UPDATED POWER COEFFICIENT ADJUSTED BY A DEGRADATION FUNCTION

FIELD OF THE INVENTION

The present invention relates to controlling a wind turbine with an updated power coefficient, where the updated power coefficient has been adjusted by a degradation function which is determined in an iterative adjustment process.

BACKGROUND OF THE INVENTION

Modern wind turbines are controlled and regulated continuously to ensure optimal power extraction from the wind under the current wind while at the same time ensuring that the loads on the different components of the wind turbine are at any time kept within acceptable limits and while respecting any externally set operational constraints. Based on this and following some control strategy, the turbine's control parameters are determined to perform optimally under the given conditions.

Optimal performance requires that the turbine components perform as intended in accordance with the design. Wind turbines are subject to atmospheric conditions throughout their lifetime. A hostile environment irreversibly damages the aerodynamic properties of the blades, this being the case with, e.g. leading edge erosion. Or reversibly, for instance, when ice builds up, or sand is deposited on the blades. Despite the nature of degradation, energy production (AEP) loss is expected if neither the blade shape nor the roughness is the designed one, and the turbine controller is not aware of the change.

A common control scheme of a wind turbine in a partial load operation mode is based on a tip-speed ratio (TSR) tracking scheme, which, based on the estimation of the rotor-effective wind speed, determines a power setpoint. Such a control scheme, as well as many other wind turbine control features, relies on a nominal or predetermined power coefficient ($C_p$). If the predetermined $C_p$ coefficient does not accurately resemble the actual power coefficient, the turbine will operate at a different operating point than the intended setpoint, leading to sub-optimal operations.

The wind is generally measured downwind by an anemometer, leading to a measurement disturbed by the rotating rotor. Consequently, more reliable control may be obtained using a wind speed estimator as an input control scheme. A common type of wind speed estimator is based on a power or torque balance between the aerodynamic power or torque of the rotor and the electrical power or torque of the generator. Such wind speed estimator may include an internal model of which the estimation accuracy is sensitive to the accuracy of the power coefficient information with respect to the actual power coefficient.

It is against this background that the invention has been devised.

SUMMARY OF THE INVENTION

It would be advantageous to ensure that a wind turbine is controlled in accordance with a power coefficient which reflects actual rotor characteristics rather than nominal rotor characteristics. In particular, it would be beneficial to provide a manner of updating the power coefficient to better reflect the actual power coefficient in a situation where there is a mismatch between the predetermined or nominal power coefficient and the actual power coefficient.

Accordingly, in a first aspect, there is provided a method of controlling a wind turbine in a partial load operation mode based on a tip-speed ratio (TSR) tracking scheme which based on an estimated wind speed determines a power setpoint, the estimated wind speed being determined based on a power or torque balance between the aerodynamic power or torque of the rotor and the electrical power or torque of the generator, wherein the TSR tracking scheme ensures operation in accordance with an operating power coefficient, and wherein the operating power coefficient has been adjusted in an iterative adjustment process, the iterative adjustment process comprises:

setting an updated power coefficient as a predetermined power coefficient multiplied by a degradation function;

while operating the wind turbine at a selected TSR, obtain a measurement set comprising a series of measurements of at least a generator power, a rotor effective wind speed and a rotor speed;

calculate the degradation function that represents the values of the measurement set;

calculate a mean operating TSR of the measurement set, and set the degradation function equal to the calculated degradation function for the mean operating TSR;

determine a continuous degradation function for a range of the mean operating TSR value(s), and set the operating power coefficient as the updated power coefficient using the continuous degradation function in the range of the mean operating TSR values;

determine a difference between the selected TSR and the mean operating TSR;

if the difference is above a preset difference, set the operating power coefficient as the updated power coefficient for the selected TSR, and perform another iteration.

The inventors of the present invention have realized that an excitation free learning algorithm for the calibration of the internal physical model parameters can be provided while operating the wind turbine using standard closed loop measurements, complemented with an external measurement of the rotor effective wind speed (REWS). The learning algorithm is thereby largely nondisruptive. The learning algorithm calibrates the internal model to accurately represent the actual aerodynamic turbine properties by providing an updated power coefficient which matches the operating turbine better than the predetermined (or design) power coefficient. The learning algorithm is based on the iterative adjustment process.

An iterative adjustment process is performed for at least one selected TSR, however in order to determine the degradation function in a broader range of the partial load region, advantageously the iterative adjustment process is performed for a number of selected TSRs. An outer iterative loop may be performed with selected TSRs at further values, including higher selected TSR values and lower selected lower TSR values with respect to the nominal TSR reference or setpoint value. In embodiments the iterative adjustment process is performed using at least three different selected TSRs, each TSR being within the partial load region of constant pitch angle and variable rotor speed. However more selected TSRs may be used. The different selected TSRs may be set at predetermined values or selected by a predetermined selection algorithms which based on the measured TSR for the first (or earlier) iteration(s) is capable of determining further selected TSRs within the partial load region of constant pitch angle and variable rotor speed.

The degradation function is calculated based on the measurement set. The degradation function may be understood as an estimated degradation function, as the aim is to estimate a degradation function that represents the values of the measurement set.

In an embodiment the calculation of the degradation function that represents the values of the measurement set comprising taking the pseudoinverse. The pseudoinverse may be taken of a vector expressing the calculated generator power obtained using the wind speed measurements and rotor speed measurements of the measurement set and the predetermined power coefficient.

The iterative adjustment process results in a number of calculated degradation function values at corresponding mean operating TSRs of the measurement sets. The mean operating TSR values span a range of values, even though for the first iteration, this range is just one point. Based on the values a continuous degradation function is obtained, e.g. by interpolating the calculated degradation function for the range of the mean operating TSR values.

The method of the present invention requires a measured rotor effective wind speed. In general any suitable sensor or device may be used for measuring the rotor effective wind speed. In embodiments, the measured rotor effective wind speed is obtained using a lidar and/or using a wind speed anemometer arranged on the wind turbine. In the embodiment where a wind speed anemometer arranged on the wind turbine is used for measuring the rotor effective wind speed, the wind speed anemometer measurements may be filtered with a time-constant, preferably in the range between 30 seconds (s) and 120 seconds (s). By filtering the wind speed anemometer measurements with a time constant, it may be possible to adjust for the inertial delay of a wind speed change on the rotating rotor. The actual time constant may depend on the turbine design.

A measurement set should be obtained for a suitable long period so that the measurement set average out any dynamic effects. In an embodiment, the measurement set is obtained over a measurement period being selected so that sufficient data is obtained to reduce the variance of the estimate, but should not be too long as the data set grows with the measurement period. A period is selected as a compromise between a minimal amount of data to ensure a low variance and computing resources. In embodiments, the measurement period is predefined based on expected wind turbine conditions, and the measurement period may be selected to be at least 1000 s, such as between 1000 s and 10000 s.

To ensure that the measurement set will average out dynamical effects for a given size of the measurement set, the adjustment process may be conditioned upon the turbulence intensity being below a predefined turbulence intensity level.

After the adjustment process, the wind turbine may be operated using the updated power coefficient. In addition to the tip-speed ratio (TSR) tracking control in partial load operation mode further control elements may also rely on the power coefficient, and the wind turbine can beneficially be operated using the updated power coefficient for more or even all controller elements using the power coefficient.

Application of the method of the present invention may also be used for turbine monitoring purposes. For example, by determining that a scaling of the operating power coefficient is needed without any realizable reason is an indication of fault of the turbine. For example, if the power coefficient has recently been changed by the method of the present invention and a new correction is needed, is likely an indication that a fault has occurred and a service inspection would be warranted.

In a further aspect there is provided a non-transient, computer-readable storage medium storing instructions thereon that when executed by one or more processors cause the one or more processors to execute a method according to the first aspect.

The method may be implemented as a computer program product, and the computer program product may be provided on the computer-readable storage medium or being downloadable from a communication network. The computer program product comprises instructions to cause a data processing system, e.g. in the form of a controller, to carry out the instruction when loaded onto the data processing system.

In a further aspect there is provided a controller for controlling a wind turbine in a partial load operation mode in accordance with the first aspect. In a yet further aspect there is provided a wind turbine comprising the controller.

In general, a controller may be a unit or collection of functional units which comprises one or more processors, input/output interface(s), and a memory capable of storing instructions that can be executed by a processor.

In general, the various aspects of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described by way of example only, with reference to the drawings, in which.

DESCRIPTION OF EMBODIMENTS

Figure 1:
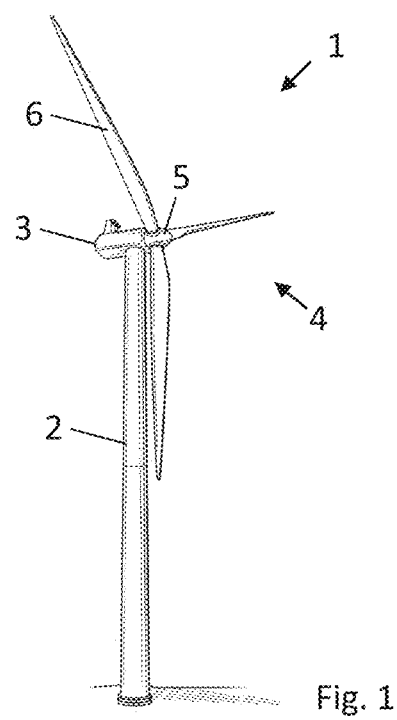
FIG. 1 illustrates, from a schematic perspective view, an example of a wind turbine.

FIG. 1 illustrates, in a schematic perspective view, an example of a wind turbine 1. The wind turbine 1 includes a tower 2, a nacelle 3 disposed at the apex of the tower, and a rotor 4 operatively coupled to a generator housed inside the nacelle 3. In addition to the generator, the nacelle houses miscellaneous components required for converting wind energy into electrical energy and various components needed to operate, control, and optimize the performance of the wind turbine 1. The rotor 4 of the wind turbine includes a central hub 5 and a plurality of blades 6 that project outwardly from the central hub 5. In the illustrated embodiment, the rotor 4 includes three blades 6, but the number may vary. Moreover, the wind turbine comprises a control system. The control system may be placed inside the nacelle or distributed at a number of locations inside (or externally to) the turbine and communicatively connected.

Figure 2:
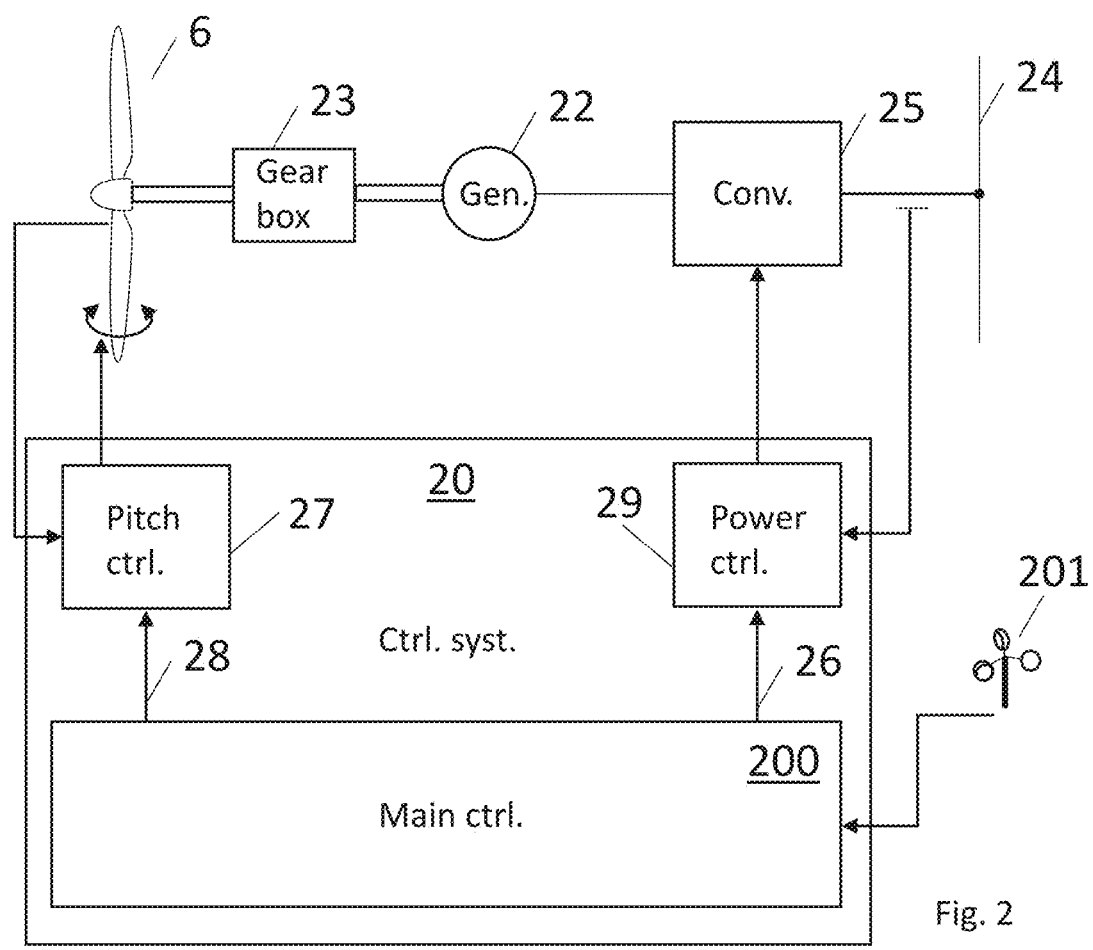
FIG. 2 schematically illustrates an embodiment of a control system together with elements of a wind turbine.

FIG. 2 schematically illustrates an embodiment of a control system 20 together with elements of a wind turbine. The wind turbine comprises rotor blades 6, which are mechanically connected to an electrical generator 22 via gearbox 23. In direct drive systems, and other systems, the gearbox may not be present. The electrical power generated by the generator 22 is injected into a power grid 24 via an electrical converter 25. The electrical generator 22 and the converter 25 may be based on a full-scale converter (FSC) architecture or a doubly fed induction generator (DFIG) architecture, but other types may be used.

The control system 20 comprises several elements, including at least one main controller 200 with a processor and memory so that the processor is capable of executing computing tasks based on instructions stored in the memory. In general, the wind turbine controller ensures that in operation the wind turbine generates a requested power output level. This is obtained by adjusting the pitch angle and/or the power extraction of the converter. To this end, the control system comprises a pitch system including a pitch controller 27 using a pitch reference 28 and a power system including a power controller 29 using a power reference 26. The power controller controls the various electric components of the generator converter system to deliver the requested power, hereunder controls the torque of the generator that is needed to extract the requested power by the rotor from the wind.

FIG. 2 further illustrates a wind sensor 201 for measuring the rotor effective wind speed. The wind sensor may e.g. be a lidar mounted on the wind turbine, or at another appropriate location. Alternatively, the wind sensor may be a wind anemometer arranged for measuring the rotor effective wind speed. Anemometer wind sensors are typically mounted on the nacelle. The wind sensor is illustrated as a cup anemometer, this however is only for illustrative reasons. The actual type of wind sensor may be as mentioned above, and any type suitable for measuring the rotor effective wind speed.

Figure 3:
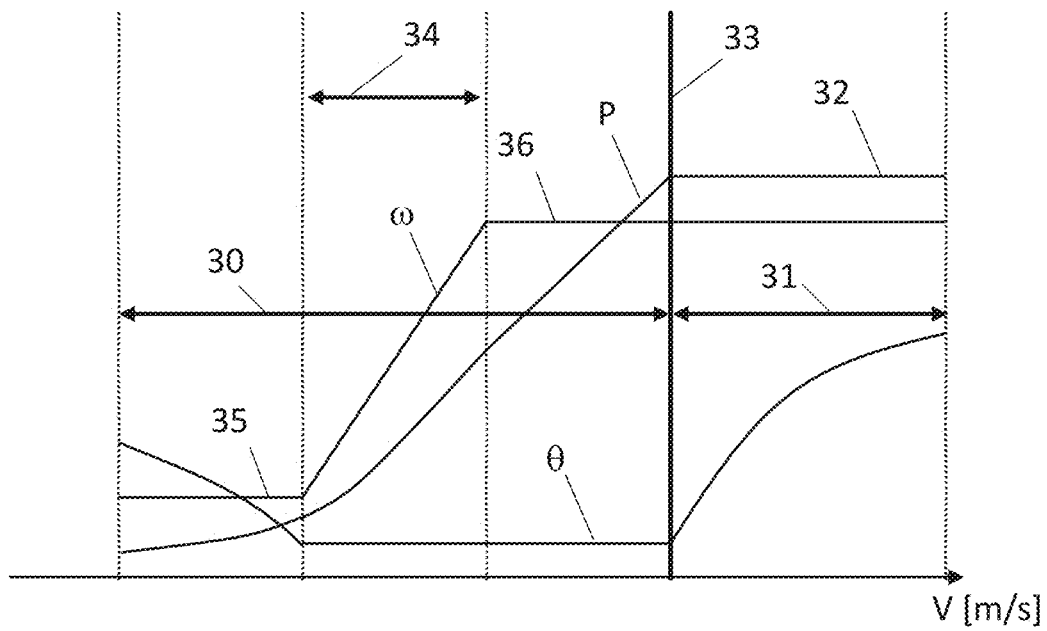
FIG. 3 illustrates a general control scheme divided into a partial load operation area and a full load operation area.

FIG. 3 illustrates a general control scheme divided into a partial load operation area 30 and a full load operation area 31. In partial load operation 30, the wind turbine controller may adjust the pitch (θ) of the blades to an optimal pitch angle, typically around zero degrees. This ensures that while the wind turbine is not producing the maximum amount of electricity it is able to produce it is controlled to capture as much energy from the wind as it can. If there is sufficient energy in the wind (i.e. the wind speed is above the rated wind speed 33) the wind turbine will operate in full load operation 31 while generating rated power 32, and control of the wind turbine blade pitch is used to turn the blades out of the wind to avoid overspeed of the generator and/or unsafe operation of the turbine while keeping the rotor speed constant. The figure moreover shows rotor speed (ω) and generated power (P).

While operating in the partial load region 30, the turbine may be controlled based on a tip-speed ratio (TSR) tracking scheme, which based on an estimated wind speed, determines a power setpoint P. The estimated wind speed being determined based on a power or torque balance between the aerodynamic power or torque of the rotor and the electrical power or torque of the generator. The TSR tracking scheme ensures operation in accordance with an operating power coefficient. It is important that the operating power coefficient closely matches the real or actual power coefficient of the wind turbine. To ensure this, the operating power coefficient may be adjusted in an iterative adjustment process in accordance with embodiments of the present invention.

Figure 4:
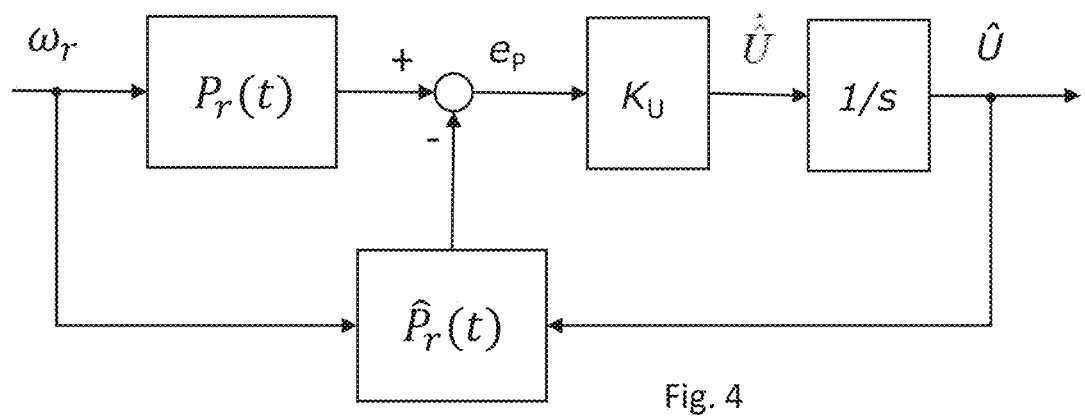
FIG. 4 illustrates in a schematic manner elements of a wind speed estimator.

FIG. 4 illustrates in a schematic manner elements of a wind speed estimator based on a power or torque balance between the aerodynamic power or torque of the rotor and the electrical power or torque of the generator.

The actual rotor speed ($\omega_r$) is measured by a rotor speed sensor and input into a computing block which determines the operating rotor power $P_r(t)$ as a sum of the power setpoint, $P_g$, and the power obtained from the rotor inertia. The operating rotor power is obtained from the power balance equation:

$$J\dot{\omega}_r(t)\omega_r(t) = P_r(t) - P_g(t)$$

Here shown without taking losses into account. It is within the abilities of the skilled person to include mechanical and electrical losses.

The operating rotor power $P_r(t)$ is compared to an estimated rotor power $\hat{P}_r(t)$ obtained from an internal model based on an estimated power coefficient, determined as:

$$\hat{P}_r = \frac{1}{2}\rho A \hat{U}^3 \hat{C}_P(\hat{\lambda}),$$

where $\hat{C}_p$ is the estimated power coefficient and $\hat{\lambda}$ is the estimated TSR:

$$\hat{\lambda} = \omega_r R / \hat{U}$$

with $\hat{U}$ being the estimated wind speed, that is the estimated rotor-effective wind speed.

The estimated wind speed can be determined by the application of a proportional action as:

$$\hat{U} = K_{U \in P} = K_U(P_g - P_r + J\dot{\omega}_r \omega_r),$$

where $K_U$ is the estimator gain and $e_p$ is the power error being determined as the difference between an operating rotor power and an estimated rotor power. It is within the ability of the skilled person to solve this differential equation during the operation of the wind turbine to determine the estimated wind speed, $\hat{U}$.

Based on the estimated wind speed, the tip-speed ratio tracking control scheme may be implemented as a proportional-integral (PI) controller $$\dot{P}_g = K_p \dot{e}_\omega + K_I e_\omega$$

in which the error $e_w = r_\omega - \omega_r$ is the respective difference between the rotor speed and the time-varying rotor speed setpoint $r_\omega(t)$.

Figure 5:
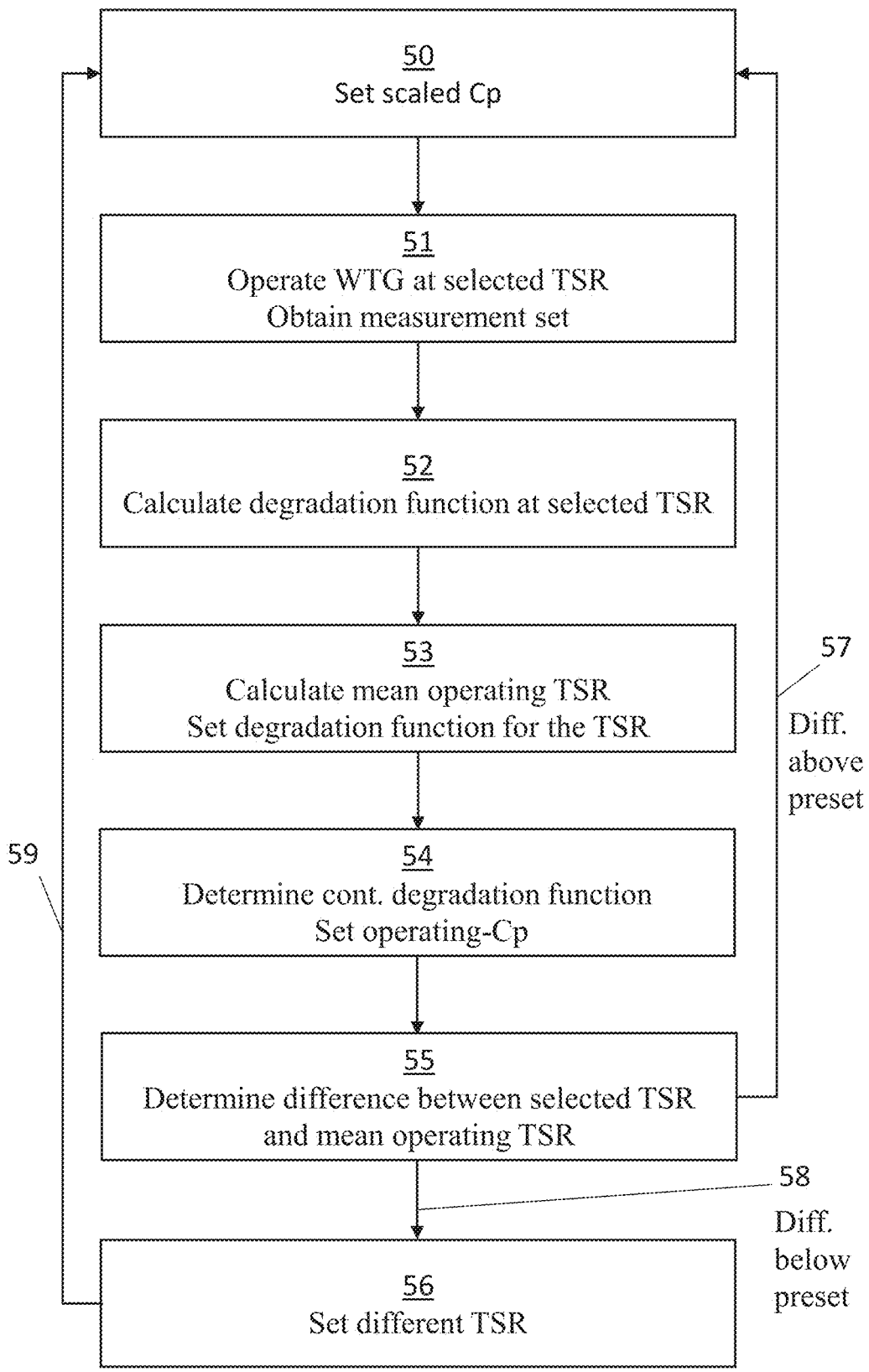
FIG. 5 illustrates a flow diagram of elements of the iterative adjustment process.

FIG. 5 illustrates a flow diagram of elements of the iterative adjustment process, also referred to as the learning process, for determining the degradation function and thereby the updated power coefficient. The iterative adjustment process comprises, in a step 50, to set an updated power coefficient, $C_p$, as a predetermined power coefficient multiplied by a degradation function, $\Gamma(\lambda)$. The updated power coefficient is set as a function of the tip-speed ratio, TSR, $\lambda$:

$$C_P(\lambda) \triangleq \Gamma(\lambda) C_P^\diamond(\lambda)$$

The predetermined power coefficient may be the design power coefficient for the wind turbine, or it may be a power coefficient obtained in an earlier adjustment process.

In a further step 51, the wind turbine is operated at a selected tip-speed ratio k. The selected TSR may in a first iteration process be selected as the TSR corresponding to the current measured or estimated wind speed, i.e. the controller setpoint. The selected TSR is constrained downwards by a minimum speed of the generator, such as a minimum static generator speed 35. In the same manner, the TSR is constrained upwards by the rated generator speed 36. The execution of the iterative adjustment process is therefore constrained by the wind speed as the selected TSR is selected for the operational region 34 of constant pitch angle and variable rotor speed of the partial load region.

While operating at the selected TSR, a measurement set comprising a series of measurements of at least the generator power, the rotor effective wind speed and the rotor speed is obtained. The measurement set:

$$\mathcal{D} = (P_g^T, \tilde{U}^T, \omega_r^T)$$

can be expressed as a set of three vectors of sample values obtained during closed-loop operation of the wind turbine for a measurement period.

In a further step 52, the degradation function that represents the values of the measurement set for the selected tip-speed ratio is calculated.

As is well known in the art of wind turbines, the generator power, the power coefficient and the wind speed are closely connected, and by measuring generator power over the period of time it can be determined if the predetermined power coefficient represents the measured power coefficient, and if not so, an updated power coefficient can be determined which represents the measured power coefficient more closely. In the present invention if a mismatch is present, such mismatch is expressed by use of the degradation function, which takes the value 1 if the measured power coefficient represents the model power coefficient or is otherwise not equal to 1.

In an example embodiment, to calculate the degradation function for the selected tip-speed ratio, the wind turbine is operated in closed-loop operation under steady-state conditions (($\dot\omega_r=0$)). In example embodiments, the adjustment process is conditioned upon the turbulence intensity being below a predefined turbulence intensity level, thereby ensuring steady-state conditions, as least for in average for the duration of the measurement set. In general, however, a limit on the turbulence intensity need not be set.

While operating under steady-state conditions, the rotor and measured generator power can be set equal to the estimated aerodynamic rotor power, such that:

$$P_g = \hat{P}_r \rightarrow K C_P(\lambda) U^3 = K \hat{C}_P(\hat\lambda) \hat{U}^3,$$

Where the ^-symbol represent estimated values and K=pA/2, p being the air density and A the area of the rotor disc.

For the wind speed estimator, in a similar manner, an estimated degradation function may be applied:

$$\hat{C}_P(\lambda) \triangleq \hat\Gamma(\lambda) C_P^\diamond(\lambda)$$

It can be presumption that $$\Gamma(\lambda) \neq \Gamma(\hat\lambda) \forall (\lambda = \hat\lambda)$$

Furthermore, the right-hand side of the above wind speed and tip-speed ratio estimates can be replaced with the measurement-based quantities, leading to that the above-defined equality becomes a steady-state inequality:

$$P_g \neq \hat{P}_r \rightarrow K C_P(\lambda) U^3 \neq K \hat\Gamma(\tilde\lambda) C_P^\diamond(\tilde\lambda) \tilde{U}^3,$$

with $\tilde\lambda = \omega_r R / \tilde{U}$ being the measured TSR. The inequality is induced by the inconsistency of the modelled internal power coefficient information, and the introduction of the external wind speed measurement. The equation's left-hand side is replaced by the measured generator power. Also, at the right-hand side, because now the measured wind speed is used, the modelled power coefficient information should be corrected locally by $\hat\Gamma$ at the actual average TSR operating point, such that:

$$P_g \neq \hat\Gamma(\bar\lambda)(K C_P^\diamond(\bar\lambda) \tilde{U}^3),$$

and the actual averaged turbine operating point, i.e. the mean operating TSR, is approximated as $$\bar\lambda \approx \frac{1}{N} \sum_{k=1}^{N} \tilde\lambda(k).$$

This relation holds under steady-state conditions, or when N is large enough to average out dynamic effects. Finally, as all quantities in the above in-equality of the generator power are either known or measured except for $\hat\Gamma(\bar\lambda)$, and by replacing the scalar variables with the measured vector quantities from D, the estimated degradation function $\hat\Gamma(\bar\lambda)$ is obtained at selected tip-speed ratio by solving as follows $$\hat\Gamma(\bar\lambda) = P_g (K C_P^\diamond(\bar\lambda) \tilde{U}^3)^\dagger,$$

with $(\cdot)^\dagger$ representing the pseudoinverse.

A degradation function that represents the values of the measurement set is thereby calculated. That is the value of the degradation function at the mean operating TSR is thereby calculated.

The adjustment process is performed with the wind turbine in a partial load operation mode based on a tip-speed ratio (TSR) tracking scheme based on an estimated wind speed. As a consequence the model uncertainty in the control scheme may result in the commanded tip-speed ratio set-point not being equal to the actual averaged TSR operating point (the mean operating TSR).

In step 53, the mean operating TSR of the measurement set is calculated, and the degradation function is set equal to the calculated degradation function for the mean operating TSR.

In step 54, a continuous degradation function for the range of the mean operating TSR values is determined, and the operating power coefficient is set as the updated power coefficient using the continuous degradation function in the range of the mean operating TSR values. In this manner the degradation function, and thereby the operating power coefficient is set based on as the continuous degradation function in the range of the mean operating TSR values. Outside the range of the mean operating TSR values the operating power coefficient may be set constant, e.g. using the calculated degradation function of the respective end-points of the range of the mean operating TSRs.

The determination of the continuous degradation function may comprise interpolating the calculated degradation function for the range of the mean operating TSR values. Such interpolation may be a linear interpolation, a spline-based interpolation, or any other suitable interpolation.

In the first iteration only a single degradation function value for a single TSR value is obtained. In the first iteration, the degradation function may be set equal to the single degradation function value for the entire TSR operating range of the partial load region or the range may be set to only comprise the single value.

In a step 55, a preset difference, c, between the selected tip-speed ratio and an average tip-speed ratio of the measurement set (mean operating TSR) is determined, for example by setting up the below criterion:

$$\left|\frac{\lambda_j^* - \overline{\lambda}_i}{\lambda_j^*}\right| < \epsilon,$$

If the difference is above the preset difference 57, the operating power coefficient is set as the updated power coefficient for the selected TSR, and another iteration is performed.

Setting the operating power coefficient as the updated power coefficient for the selected tip-speed ratio, amounts to updating the internal power coefficient information in the wind speed estimator TSR tracking scheme. The following iteration will therefore be done with an estimated power coefficient which more closely represents the actual power coefficient.

In a typical situation, more than one iteration is performed before the difference is below the preset difference. If only a single iteration is needed to meet the preset difference, the preset difference may be set to a smaller value, and the iterative adjustment process may be continued 57 with the smaller preset difference.

If at least two iterations are performed before the preset difference is met, a set of degradation functions values are obtained for elements of the mean operating TSR:

$$\hat{\Gamma}_i(\overline{\lambda}_i) = [\hat{\Gamma}_1(\overline{\lambda}_1), \ldots, \hat{\Gamma}_n(\overline{\lambda}_n)],$$

where n is the number of iterations, and where the mean operating TSR span a given range. It is based on this set of values that the continuous degradation function is determined.

For a given selected TSR, the iteration process is terminated if the difference is below a preset difference 58.

In an embodiment the degradation function may be learned in a broader interval of the partial load region. To achieve this, in a further step 56, a different TSR is selected and the iterative adjustment process is repeated with the different selected TSR. That is the wind turbine is commanded to operate at a different TSR setpoint for the subsequent iterative adjustment process.

In an embodiment the iterative adjustment process is performed using at least three different selected TSRs, each TSR being within the partial load region of constant pitch angle and variable rotor speed. The iterative adjustment process may be performed for more than three different selected TSR, if a more finely defined degradation function is desired.

In a further iterative adjustment process, the selected TSR may be selected at higher TSR value than the any value of an earlier used TSR value(s).

In a further iterative adjustment process, the selected TSR may be selected at lower TSR value than the any value of an earlier used TSR value(s).

Figure 6:
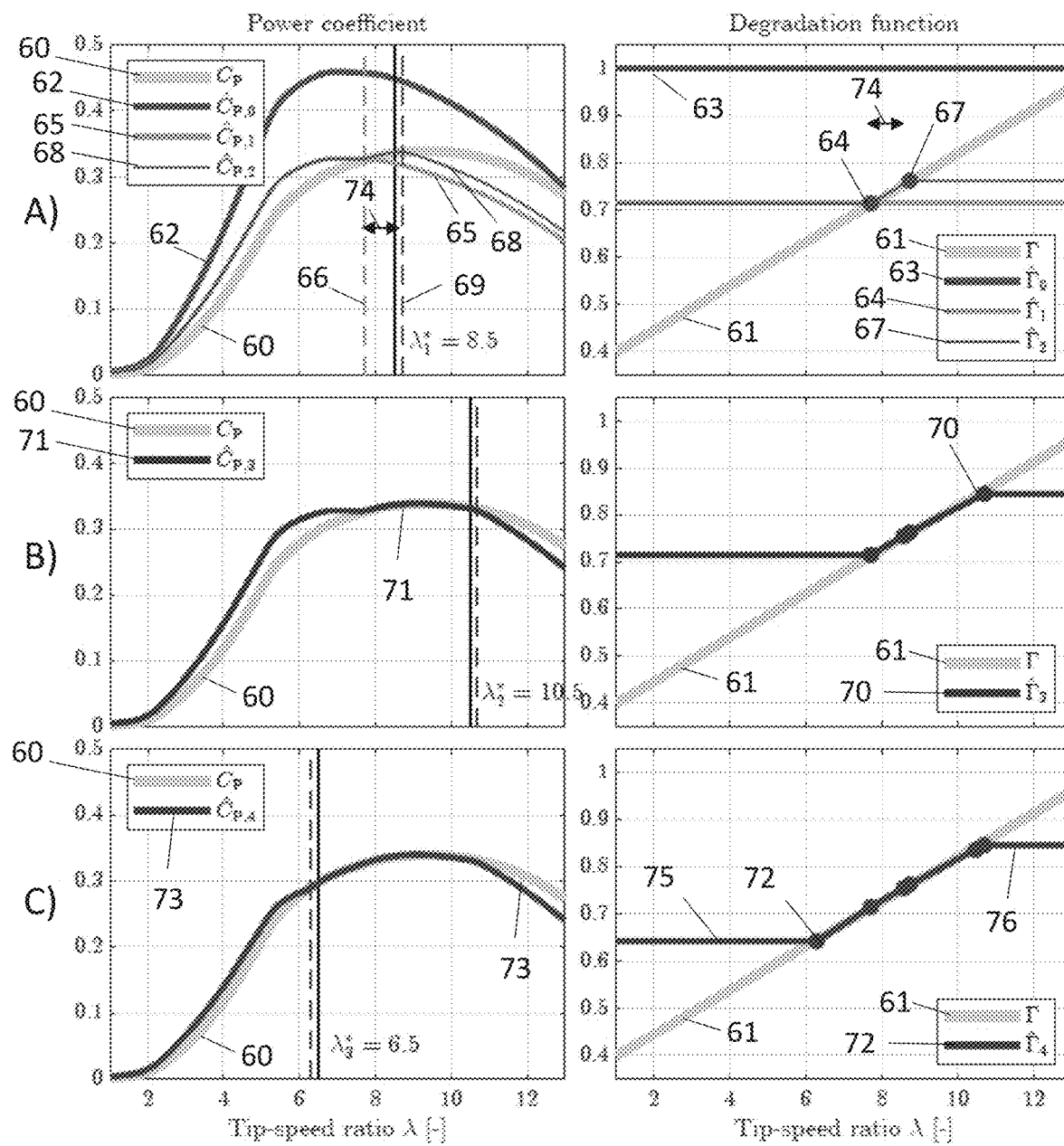
FIG. 6 illustrates a full learning cycle in different stages of the iterative adjustment process.

FIG. 6 illustrates a full learning cycle in different stages of the iterative adjustment process in terms of the power coefficient and the degradation function.

In connection with FIG. 6, the iterative adjustment process is illustrated based on simulation. The simulations have been performed on the NREL 5-MW reference wind turbine. Simulations obtained on the NREL reference wind turbine is known and available to the skilled person. The NREL reference wind turbine is for example described in the Technical Report NREL/TP-500-38060 from February 2009 by J. Jonkman, S. Butterfield, W. Musial, and G. Scot entitled "Definition of a 5-MW Reference Wind Turbine for Offshore System Development".

The simulation sampling time used is $T_s=0.01$ s. Data is collected for 1500 s of which the first 200 s are discarded to exclude transient effects, resulting in N=130.000 data samples per measured signal. A realistic turbulent wind field is used with a mean speed of 7 m/s and with IEC normal turbulence model (NTM) and class A turbulence characteristics (IEC, 2019).

For illustrative purposes, the turbine's nominal power coefficient characteristics are assumed to be aerodynamically degraded according the following linear affine degradation function $$\Gamma(\lambda) = \frac{3}{64}\lambda + 0.35,$$

represented in FIG. 6 and to be estimated by the learning algorithm.

The actual power coefficient $C_p$ is marked by reference numeral 60, and the actual degradation function is marked by reference numeral 61.

The predetermined power coefficient, i.e. the design power coefficient is, is referred to as $\hat{C}_{p,0}$ with the degradation function $\hat{\Gamma}0=1$. These are marked by reference numeral 62 and 63, respectively. As the iteration progresses $\hat{C}_{p,i} = \hat{\Gamma}_i \hat{C}_{p,0}$.

The learning algorithm relies on the availability of the data set $D_i$ throughout the consequent iterations i in the full learning cycle. For the considered case, the raw rotor effective wind speed signal U is filtered by an exponential filter $$\tilde{U}(k) = \alpha \tilde{U}(k-1) + (1-\alpha)U(k),$$

with the smoothing constant defined as $\alpha \triangleq \exp(T_s/\tau)$, and the filter time constant T set to be 50 s.

A first measurement set $D_1$ is obtained in closed-loop operation of the turbine at the tip-speed ratio setpoint $\lambda_{j=1}^* = 8.5$ (solid line). The selected TSR is thus set to 8.5 as the controller setpoint for tip-speed ratio. With $D_1$ at hand, $\overline{\lambda}$ is computed offline and $\hat{\Gamma}(\overline{\lambda})$ is calculated to shape the estimated degradation function at $\overline{\lambda}_{i=1}$. That is a single corrective calibration data point 64 is obtained and taken for the entire domain of $\hat{\Gamma}_1$.

A first updated power coefficient is $\hat{C}_{p,1}$ is obtained, marked 65.

Due to the presence of model uncertainty in the control scheme, the commanded tip-speed ratio setpoint is not equal to the actual averaged TSR operating (mean operating TSR of $D_1$). The mean operating TSR is illustrated by the dashed line marked 66.

Using $\hat{C}_{p,1}$ as the updated power coefficient implemented in the wind speed estimator, another iteration, i=2, is performed following the exact same procedure at an equal selected TSR setpoint. Since the algorithm corrects at the actual operational tip-speed ratio of the wind turbine indicated by the vertical dashed lines, the iterative process illustrates the ability of the algorithm to exploit model uncertainty to learn and converge in the neighbourhood of the TSR setpoint.

This learning routine is repeated until the convergence criterion is met in accordance with the preset difference.

Here, the convergence is met for $\hat{\Gamma}_2$, 67, with $\hat{C}_{p,2}$, 68, and the mean operating TSR at 69.

The degradation function after the iterations for the first selected TSR is thus obtained for two mean operating TSRs 64, 67 defining the end points in the range 74 of the TSR values. For illustrative purposes a linear degradation function 61 is shown in FIG. 6. In operation, the degradation function is not known before performing the iterative adjustment process, and a continuous degradation function for the range of the mean operating TSR values is determined, e.g. by fitting the set of degradation functions values of the mean operating TSRs to a linear function which would be co-located with the shown degradation function 61 for the shown example.

Whenever the convergence criterion is satisfied, the TSR setpoint is relocated towards $\lambda_{j=2}^*=10.5$ (solid line) as illustrated in FIG. 6B. That is a higher TSR is selected. The relocation is temporary and done while a third data set $D_3$ is obtained. This setpoint alteration is performed such that the internal power coefficient can be reshaped in a broader operating region of the turbine. The same procedure of iterative closed-loop data collection, calibration and updating the internal model is followed until convergence according to the above criterion is met. The resulting degradation function $\hat{\Gamma}_3$ and updated power coefficient $\hat{C}_{P,3}$ are marked 70 and 71 respectively. Again, due to the model mismatch, the actual operating TSR of the measurement set is not $\lambda_{j=2}^*=10.5$. The mean operating TSR is at a slightly larger value, as marked by the broken line in FIG. 6B.

In FIG. 6C, the procedure is executed for a final setpoint relocation $\lambda_{j=3}^*=6.5$ where a lower selected TSR is used. The final estimated degradation function $\hat{\Gamma}_4$ is marked 72 and the $\hat{C}_{P,4}$ is marked 73. As can be seen, the iterative procedure provides for that $\hat{\Gamma}(\hat{\lambda})$ can be learned in a broad operating domain where actual turbine operation is feasible, and accurately reflects the actual turbine power coefficient properties throughout the explored domain. The broad domain being defined by the range of the mean operating TSR values.

Thus a number of degradation function values has been calculated for the corresponding mean operating TSRs, resulting in that an estimated degradation function is obtained for the entire range of the mean operating TSR values. Outside the range of the mean operating TSR values the degradation function may be set constant, e.g. as the calculated degradation function of the respective end-points, 75, 76.

As can be seen on the lefthand side of FIG. 6C, inside the range of the mean operating TSRs a good fit of the operating power coefficient is obtained, whereas outside the range of the mean operating TSRs the fit is less good, however it is nevertheless somewhat better than the design power coefficient 62. Moreover, it is in the region of the maximum power coefficient that a good fit is most important.

Thus an embodiment of the iterative adjustment process has been provided.

Example embodiments of the invention have been described for the purposes of illustration only and not to limit the scope of the invention as defined in the accompanying claims.

The invention claimed is:

1. A method of controlling a wind turbine in a partial load operation mode based on a tip-speed ratio (TSR) tracking scheme which based on an estimated wind speed determines a power setpoint, the estimated wind speed being determined based on a power or torque balance between an aerodynamic power or torque of a rotor and an electrical power or torque of a generator, wherein the TSR tracking scheme ensures operation in accordance with an operating power coefficient, and wherein the operating power coefficient has been adjusted in an iterative adjustment process, the iterative adjustment process comprising:

setting an updated power coefficient as a predetermined power coefficient multiplied by a degradation function;
while operating the wind turbine at a selected TSR, obtaining a measurement set comprising a series of measurements of at least a generator power, a rotor effective wind speed and a rotor speed;
calculating the degradation function that represents values of the measurement set;
calculating a mean operating TSR of the measurement set, and set the degradation function equal to the calculated degradation function for the mean operating TSR;
determining a continuous degradation function for a range of the mean operating TSR value(s), and set the operating power coefficient as the updated power coefficient using the continuous degradation function in the range of the mean operating TSR values;
determining a difference between the selected TSR and the mean operating TSR; and
if the difference is above a preset difference, setting the operating power coefficient as the updated power coefficient for the selected TSR, and performing another iteration.

2. The method according to claim 1, further comprising setting the selected TSR at higher TSR and perform the iterative adjustment process using the selected higher TSR.

3. The method according to claim 1, further comprising setting the selected TSR at lower TSR and perform the iterative adjustment process using the selected lower TSR.

4. The method according to claim 1 wherein the iterative adjustment process is performed using at least three different selected TSRs, each TSR being within a partial load region of constant pitch angle and variable rotor speed.

5. The method according to claim 1 wherein the calculation of the degradation function that represents the values of the measurement set comprising taking a pseudoinverse.

6. The method according to claim 1 wherein the determination of the continuous degradation function comprises interpolating the calculated degradation function for the range of the mean operating TSR values.

7. The method according to claim 1 wherein the measured rotor effective wind speed is obtained using a lidar.

8. The method according to claim 1 wherein the measured rotor effective wind speed is obtained using a wind speed anemometer arranged on the wind turbine.

9. The method according to claim 8, wherein the wind speed anemometer measurements are filtered with a time-constant.

10. The method according to claim 1 wherein the measurement set is obtained over a selected measurement period.

11. The method according to claim 1, wherein the adjustment process is conditioned upon a turbulence intensity being below a predefined turbulence intensity level.

12. The method according to claim 1, wherein after the iterative adjustment process the wind turbine is operated using the updated power coefficient.

13. A non-transient, computer-readable storage medium storing instructions thereon that when executed by one or more processors cause the one or more processors to execute an operation of controlling a wind turbine in a partial load operation mode based on a tip-speed ratio (TSR) tracking scheme which based on an estimated wind speed determines a power setpoint, the estimated wind speed being determined based on a power or torque balance between an aerodynamic power or torque of a rotor and an electrical power or torque of a generator, wherein the TSR tracking scheme ensures operation in accordance with an operating power coefficient, and wherein the operating power coefficient has been adjusted in an iterative adjustment process, the iterative adjustment process comprising:
- setting an updated power coefficient as a predetermined power coefficient multiplied by a degradation function;
- while operating the wind turbine at a selected TSR, obtaining a measurement set comprising a series of measurements of at least a generator power, a rotor effective wind speed and a rotor speed;
- calculating the degradation function that represents values of the measurement set;
- calculating a mean operating TSR of the measurement set, and set the degradation function equal to the calculated degradation function for the mean operating TSR;
- determining a continuous degradation function for a range of the mean operating TSR value(s), and set the operating power coefficient as the updated power coefficient using the continuous degradation function in the range of the mean operating TSR values;
- determining a difference between the selected TSR and the mean operating TSR; and
- if the difference is above a preset difference, setting the operating power coefficient as the updated power coefficient for the selected TSR, and perform another iteration.

14. A controller for controlling a wind turbine in a partial load operation mode based on a tip-speed ratio (TSR) tracking scheme which based on an estimated wind speed determines a power setpoint, the estimated wind speed being determined based on a power or torque balance between an aerodynamic power or torque of a rotor and an electrical power or torque of a generator, wherein the TSR tracking scheme ensures operation in accordance with an operating power coefficient, and wherein the operating power coefficient has been adjusted in an iterative adjustment process, the iterative adjustment process comprising:
- setting an updated power coefficient as a predetermined power coefficient multiplied by a degradation function;
- while operating the wind turbine at a selected TSR, obtaining a measurement set comprising a series of measurements of at least a generator power, a rotor effective wind speed and a rotor speed;
- calculating the degradation function that represents values of the measurement set;
- calculating a mean operating TSR of the measurement set, and set the degradation function equal to the calculated degradation function for the mean operating TSR;
- determining a continuous degradation function for a range of the mean operating TSR value(s), and set the operating power coefficient as the updated power coefficient using the continuous degradation function in the range of the mean operating TSR values;
- determining a difference between the selected TSR and the mean operating TSR; and
- if the difference is above a preset difference, setting the operating power coefficient as the updated power coefficient for the selected TSR, and performing another iteration.

15. A wind turbine, comprising:
a controller for controlling the wind turbine in a partial load operation mode based on a tip-speed ratio (TSR) tracking scheme which based on an estimated wind speed determines a power setpoint, the estimated wind speed being determined based on a power or torque balance between an aerodynamic power or torque of a rotor and an electrical power or torque of a generator, wherein the TSR tracking scheme ensures operation in accordance with an operating power coefficient, and wherein the operating power coefficient has been adjusted in an iterative adjustment process, the iterative adjustment process comprising:
- setting an updated power coefficient as a predetermined power coefficient multiplied by a degradation function;
- while operating the wind turbine at a selected TSR, obtaining a measurement set comprising a series of measurements of at least a generator power, a rotor effective wind speed and a rotor speed;
- calculating the degradation function that represents values of the measurement set;
- calculating a mean operating TSR of the measurement set, and set the degradation function equal to the calculated degradation function for the mean operating TSR;
- determining a continuous degradation function for a range of the mean operating TSR value(s), and set the operating power coefficient as the updated power coefficient using the continuous degradation function in the range of the mean operating TSR values;
- determining a difference between the selected TSR and the mean operating TSR; and
- if the difference is above a preset difference, setting the operating power coefficient as the updated power coefficient for the selected TSR, and performing another iteration.

* * * * *